United States Patent [19]
Akridge

[11] Patent Number: 4,585,714

[45] Date of Patent: Apr. 29, 1986

[54] QUATERNARY VITREOUS SOLID LITHIUM CATION CONDUCTIVE ELECTROLYTE

[75] Inventor: James R. Akridge, Parma, Ohio

[73] Assignee: Union Carbide Corporation, Danbury, Conn.

[21] Appl. No.: 749,780

[22] Filed: Jun. 28, 1985

[51] Int. Cl.$^4$ .............................................. H01M 6/18
[52] U.S. Cl. ..................................... 429/193; 429/199; 429/213; 429/218
[58] Field of Search ................. 429/191, 193, 199, 30, 429/33, 218, 212, 213; 252/62.2; 501/40, 41, 43, 44, 45, 55, 56, 57, 73; 423/303, 304, 324, 325, 332, 341

[56] References Cited

U.S. PATENT DOCUMENTS

| | | | |
|---|---|---|---|
| 4,331,750 | 5/1982 | Malugani et al. | 429/193 |
| 4,465,746 | 8/1984 | Akridge | 429/191 |
| 4,477,545 | 10/1984 | Akridge et al. | 429/191 |
| 4,478,920 | 10/1984 | Gabano et al. | 429/191 |
| 4,513,070 | 4/1982 | Carette et al. | 429/193 |

FOREIGN PATENT DOCUMENTS

59-73851  4/1984  Japan.

*Primary Examiner*—Anthony Skapars
*Attorney, Agent, or Firm*—C. F. O'Brien

[57] ABSTRACT

A solid state electrolyte for a solid state cell system comprising a quaternary vitreous lithium cation conductor having a conductivity of at least $0.75 \times 10^{-4}$ ohm$^{-1}$cm$^{-1}$ at 25° C.

16 Claims, No Drawings

QUATERNARY VITREOUS SOLID LITHIUM CATION CONDUCTIVE ELECTROLYTE

DESCRIPTION OF THE INVENTION

1. Technical Field

The invention relates to a quaternary solid state electrolyte based on a vitreous lithium cation conductor of the composition:

$$aX, bLi_2S, Y, Z$$

where:
- X is selected from the group consisting of $P_2S_5$ and $SiS_2$;
- a is from about 0.5 to about 2;
- b is from 0.25 to 2;
- Y is an oxygen-containing lithium compound selected from the group consisting of $Li_2CO_3$, $Li_2SiO_3$ and $Li_4SiO_4$;
- Z is a dopant selected from the group consisting of LiI, LiBr, LiCl and LiF; and wherein said composition has a conductivity of at least $0.75 \times 10^{-4}$ ohm$^{-1}$ cm$^{-1}$ at 25° C.

2. Background of the Art

Ionic conductivity is usually associated with the flow of ions through a liquid solution of salts. In the vast majority of practical uses of ionic conductors, i.e, as electrolytes for dry cell batteries, the liquid solution is immobilized in the form of a paste or gelled matrix or is absorbed in a separator to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the use of a large volume of immobilizing material has hindered the aims of miniaturization.

In addition, improved microelectronic circuit designs have generally decreased the current requirements for electronic devices. This in turn has enhanced the applicability of solid electrolyte power sources which usually can deliver currents only in the microampere range. These solid electrolyte systems have the inherent advantages of being free of electrolyte leakage and internal gassing problems due to the absence of a liquid phase. In addition, they also have a much longer shelf life than the conventional liquid electrolyte power sources.

In attempting to avoid the shortcomings of liquid systems, investigators have surveyed a large number of solid compounds seeking to find compounds which are solid at room temperature and have specific conductances approaching those exhibited by the commonly used liquid systems. Solid electrolytes must be essentially electronic insulators so as not to internally short the cell while at the same time they must allow ionic migration in the crystal lattice for the cell to operate. It has been discovered that certain metallic salts which are solids at room temperature have specific conductances sufficiently high to permit their use in practical battery applications. For example, U.S. Pat. No. 3,723,185 discloses solid state electrolytes of compounds conforming to the general formula AgI—MCN—AgCN or modifications thereof where M is potassium, rubidium, cesium or mixtures thereof.

U.S. Pat. No. 4,331,750 discloses a cation conductive vitreous composition suitable for use as a solid electrolyte and having the general formula:

$$aP_2S_5, bLi_2S, cLiX$$

where:
- X represents chlorine, bromine or iodine: c is greater than or equal to 0; the ratio $b/(a+b)$ lies between 0.61 and 0.70; and
- the ratio $c/(a+b+c)$ is less than or equal to a limit which corresponds to solubility in the vitreous phase of LiX in the composition $aP_2S_5$, $bLi_2S$.

U.S. Pat. No. 4,465,746 discloses a solid state electrolyte based on vitreous lithium cation conductor of the composition:

$$SiS_2, xLi_2S, yLiI$$

where:
- x is from 0.8 to 1.5,
- y is from 0 to about 2, and wherein said composition has a conductivity of at least $0.75 \times 10^{-4}$ ohm$^{-1}$ cm$^{-1}$ at 25° C.

U.S. Pat. No. 4,513,070 discloses an electrochemical device which uses a vitreous material having a general formula $$xA_aR_b - yN_mR_c - zN_nY_p$$

wherein a is Si, Ge, P, S, B, Nb, As, V, Cr or Mo; R is O, S or Se; N is Li, Na, K or Ag and Y is I, Br, Cl, F, $ClO_4$, $CF_3SO_3$, SCN or $SO_4$ with the proviso that the material contain at least two salts $N_nY_p$ and wherein a, b; m, c and n, p represent the indices corresponding to the stoichiometry of the constituents in a given group and x, y and z, whose sum is equal to 1, represent the indices corresponding to the overall molar fractions respectively of the compound or compounds forming the former system, the modifier system and the doping salt of the material, the values of these indices being compatible with the vitreous range of a given material.

It is an object of the present invention to provide a new class of quaternary vitreous compositions that can be used as solid electrolytes in solid state cell systems.

Another object of the invention is to provide a $SiS_2$-based or $P_2S_5$-based vitreous lithium cation conductor which contains a lithium oxide compound and which has a conductivity of at least $0.75 \times 10^{-4}$ ohm$^{-1}$ cm$^{-1}$ at 25° C.

The foregoing and additional objects will become more fully apparent from the following description.

DISCLOSURE OF THE INVENTION

The invention relates to a quaternary solid electrolyte having a vitreous lithium cation conductor of the composition:

$$aX, bLi_2S, Y, Z$$

where
- X is selected from the group consisting of $P_2S_5$ and $SiS_2$;
- a is from about 0.5 to about 2;
- b is from 0.25 to 2;

Y is an oxygen-containing lithium compound selected from the group consisting of $Li_2CO_3$, $Li_2SiO_3$ and $Li_4SiO_4$;

Z is a dopant selected from the group consisting of LiI, LiBr, LiCl and LiF; and wherein said composition has a conductivity of at least $0.75 \times 10^{-4}$ $ohm^{-1} cm^{-1}$ at 25° C.

In the above quaternary composition b is preferably between about 1 and about 2. As used herein, vitreous shall mean a composition in a glassy (non-crystalline) state and shall also include materials that have been cooled so rapidly from the molten condition that crystal formation is prevented.

When X is $SiS_2$, then the vitreous composition of $SiS_2$ and $Li_2S$ or $Li_2SiS_3$ can be prepared at 1 atmosphere pressure by first mixing silicon disulfide ($SiS_2$) and lithium sulfide ($Li_2S$) in 1:1 mole ratio in an inert gas filled dry box. The mixture is then placed in a vitreous carbon crucible which in turn is placed in an inert gas reaction chamber. The $SiS_2$ and $Li_2S$ mixture is heated at an elevated temperature for a time period sufficient for the $SiS_2$ to react with the $Li_2S$ to form $Li_2SiS_3$. Generally, the $SiS_2$ and $Li_2S$ mixture can be heated at about 950° C. for about 6 hours. The $Li_2SiS_3$ is then quenched to ambient temperature (about 20° C.) to form the vitreous solid. If desired, the lithium compound can be added by grinding together the vitreous $Li_2SiS_3$ and the lithium compound, placing the mixture in a vitreous carbon crucible and then heating the mixture at an elevated temperature for a time period sufficient to form a solution of the lithium compound in the $Li_2SiS_3$ material. The material is then quenched to room temperature. Generally the mixture can be heated at about 950° C. for about 6 hours and then quenched to room temperature.

Using the above technique, $Li_2S$ and $SiS_2$ can be fused with $Li_2CO_3$, $Li_2SiO_3$ or $Li_4SiO_4$ and a dopant such as LiI, LiBr, LiCl or LiF to produce vitreous compositions all having conductivity in excess of $10^{-4}$ $ohm^{-1} cm^{-1}$. The addition of $Li_2CO_3$ and a dopant to $Li_2SiS_3$ and then fusing the materials resulted in a red-brown glass with excellent conductivity. Additionally, $Li_2CO_3$ assists in formation of a vitreous product since fusion of $Li_2S + SiS_2$ at 950° C. followed by a cold water quench to 20° C. often results in a crystalline and/or opaque material, whereas fusion and quenching of material containing $Li_2CO_3$ results in a clear reddish-brown glass. Indeed, even slow cooling the fused materials containing $Li_2CO_3$ results in a clear reddish-brown glass. Thus lithium carbonate significantly and unexpectedly aids in forming and maintaining the vitreous state such that the need to rapidly quench the melt is lessened. Lithium metasilicate, $Li_2SiO_3$, also forms a highly cationically conductive glass with $Li_2SiS_3$.

$P_2S_5$-based vitreous compositions can be prepared by melting together the components $P_2S_5$, $Li_2S$, a dopant and the lithium compound at a temperature which lies between 700° C. and 950° C., followed by tempering and then by annealing at a temperature of about 100° C. If desired, the $P_2S_5$ and $Li_2S$ components can be first heated and then the lithium compound and dopant can be added. However, the synthesis of $P_2S_5$-based materials must be performed in sealed vessels due to the volatility of $P_2S_5$.

The lithium compounds for use in the invention are $Li_2CO_3$, $Li_2SiO_3$, and $Li_4SiO_4$. These lithium compounds $Li_2CO_3$, $Li_2SiO_3$ and $Li_4SiO_4$ are believed to be network formers and not dopants while LiI, LiF, LiBr and LiCl are the dopants. Network former is a compound which provides a macromolecular network of irregular structure whereby the anion of the network former, i.e., $O^=$, $S^=$, etc., forms bridges between the cations of the network former resulting in the formation of an extended network. Network modifier is an ionic compound added to a network former which introduces covalency into the macromolecular network by incorporating its anion into the macromolecular network by cleavage of some of the bridges between the network former cation and the associated network former anion and bonding the modifier anion to the network former cation. Network dopant is a compound added to a network former or the network former plus network modifier which provides additional mobile cations but whose associated anion does not become incorporated into the macromolecular structure but rather plays a role more like a plasticizer especially in the case of halogenated salts.

Anode materials suitable for use with the solid electrolyte of this invention include lithium, silver, sodium, potassium, and rubidium. The preferred anode materials are lithium and lithium alloys.

Cathodes suitable for use with the solid electrolyte of this invention include poly(N-vinylpyrrolidone) (PVP)+iodine, PVP+iodine+$TiS_2$, $FeS_2$, $Sb_2S_3$, $TiS_2$, $MoS_3$, $TiS_2$+$MoS_3$, organic charge transfer complexes with halogens, and $MnO_2$.

EXAMPLE 1

Vitreous $Li_2SiS_3$ was prepared by mixing 30 grams $SiS_2$ and 15 grams $Li_2S$ in 1:1 mole ratio in a helium-filled dry box. The mixture was placed in a vitreous carbon crucible which in turn was placed in a vitreous silica reaction tube. The tube was closed and was equipped with a conventional exhaust vent and a small conventional intake feed tube adapted for feeding helium into the reaction tube. The $SiS_2$ and $Li_2S$ mixture, under a 1 atmosphere pressure of helium, was heated at 950° C. for 6 hours and then the reaction tube was quenched to room temperature (20° C.) by submerging the reaction tube in cold water. The vitreous $Li_2SiS_3$ solid electrolyte produced was then ground.

The vitreous $Li_2SiS_3$ produced was combined with $Li_2CO_3$ and LiBr or LiI. The mixture was ground, placed in a vitreous carbon crucible and then placed in a reaction tube. Under 1 atmosphere helium pressure, the $Li_2SiS_3$, $Li_2CO_3$ and LiI or LiBr mixtures were each heated at 950° C. for 6 hours and then the reaction tube was quenched to room temperature (20° C.) by submerging the reaction tube in cold water. The quaternary vitreous solid electrolytes produced were ground, pelletized and found to have a conductivity as shown in Table 1.

Specifically the conductivity was measured by pelletizing (via the application of uniaxial pressure) the powdered material between titanium disulfide electrodes at 13,000 psi in a conventional steel mold with steel rams. The disc of solid electrolyte with $TiS_2$ electrodes was ejected from the mold and then heat sealed in a polyethylene bag. The sample sealed in the bag was then placed in an alcohol-filled polytetrafluoroethylene cylinder with a tight fitting lid which was in turn placed in a large steel mold fitted with steel rams. The alcohol-filled polytetrafluoroethylene cylinder containing the sample was then compressed to 54,000 psi which results in an isostatic compression of the glass sample disc and its associated electrodes. The $TiS_2$/solid electrolyte/-

TiS$_2$ sample was placed in a spring-loaded holder fitted with gold contacts. The conductivity of the sample was measured using the complex plane technique first applied to solid electrolytes by J. E. Bauerle, J. Phys. Chem. Solids, 30,657 (1969). The complex plane technique is at present almost universally applied for the measurement of conductivity of solid electrolytes.

TABLE 1

Conductivity at 25° C.

| Vitreous Composition | Conductivity ohm$^{-1}$ cm$^{-1}$ |
|---|---|
| Li$_2$SiS$_3$.0.25LiBr.0.1875Li$_2$CO$_3$ | 4.7 × 10$^{-4}$ |
| Li$_2$SiS$_3$.0.5LiBr.0.37Li$_2$CO$_3$ | 1.04 × 10$^{-4}$ |
| Li$_2$SiS$_3$.0.25LiI.0.375Li$_2$CO$_3$ | 2.3 × 10$^{-4}$ |

EXAMPLE 2

A 0.787 inch diameter by 0.063 inch high coin cell was constructed as follows. A cathode composed of TiS$_2$ containing some solid electrolyte of 0.25LiI.0.375Li$_2$CO$_3$.Li$_2$SiS$_3$ and powdered aluminum as a conductivity aid was employed. The TiS$_2$ cathode along with a separate layer of 0.25LiI.0.375Li$_2$CO$_3$.Li$_2$SiS$_3$ electrolyte as prepared in Example 1 and a lithium anode were isostatically compressed at 80,000 psi as described in U.S. Pat. No. 4,477,545 and then assembled into the cell housing. The cell was continuously discharged at ambient temperature across a 30 Kohm load to a 1.4 volt cutoff. The voltage readings observed with time are shown in Table 2.

TABLE 2

Li/0.25LiI.0.375Li$_2$CO$_3$.Li$_2$SiS$_3$/TiS$_2$

| Voltage (volts) | Time (hours) |
|---|---|
| 2.42 | 0 |
| 2.17 | 16 |
| 1.99 | 40 |
| 1.74 | 64 |
| 1.41 | 88 |

It should be understood that the foregoing disclosure relates to preferred embodiments of the invention and it is intended to cover all changes and modifications of the invention which do not depart from the spirit and scope of the appended claims.

What is claimed:

1. A quaternary solid state electrolyte having a vitreous lithium cation conductor of the composition:

aX, bLi$_2$S, Y, Z where
  X is selected from the group consisting of P$_2$S$_5$ and SiS$_2$;
  a is from about 0.5 to about 2;
  b is from 0.25 to 2;
  Y is an oxygen-containing lithium compound selected from the group consisting of Li$_4$SiO$_4$, Li$_2$CO$_3$ and Li$_2$SiO$_3$;
  Z is a dopant selected from the group consisting of LiI, LiBr, LiCl and LiF; and wherein said composition has a conductivity of at least 0.75×10$^{-4}$ ohm$^{-1}$ cm$^{-1}$ at 25° C.

2. The solid state electrolyte of claim 1 wherein X is SiS$_2$.

3. The solid state electrolyte of claim 1 wherein X is P$_2$S$_5$.

4. The solid state electrolyte of claim 1 or 2 wherein the quaternary vitreous lithium cation conductor is Li$_2$SiS$_3$.0.25LiBr.0.1875Li$_2$CO$_3$.

5. The solid state electrolyte of claim 1 or 2 wherein the quaternary vitreous lithium cation conductor is Li$_2$SiS$_3$.0.5LiBr.0.375 Li$_2$CO$_3$.

6. The solid state electrolyte of claim 1 or 2 wherein the quaternary vitreous lithium cation conductor is Li$_2$SiS$_3$.0.25LiI.0.375 Li$_2$CO$_3$.

7. A solid state cell comprising an anode, a cathode and a quaternary vitreous lithium cation conductor of the composition:

aX, bLi$_2$S, Y, Z where
  X is selected from the group consisting of P$_2$S$_5$ and SiS$_2$;
  a is from about 0.5 to about 2;
  b is from 0.25 to 2;
  Y is an oxygen-containing lithium compound selected from the group consisting of Li$_2$SiO$_3$, Li$_2$CO$_3$ and Li$_4$SiO$_4$;
  Z is a dopant selected from the group consisting of LiI, LiBr, LiCl and LiF; and wherein said composition has a conductivity of at least 0.75×10$^{-4}$ ohm$^{-1}$ cm$^{-1}$ at 25° C.

8. The solid state cell of claim 7 wherein X is P$_2$S$_5$.

9. The solid state cell of claim 7 wherein X is SiS$_2$.

10. The solid state cell of claim 7 wherein the vitreous lithium cation conductor is Li$_2$SiS$_3$.0.25LiBr.0.1875Li$_2$CO$_3$.

11. The solid state cell of claim 7 wherein the vitreous lithium cation conductor is Li$_2$SiS$_3$.0.5LiBr.0.375Li$_2$CO$_3$.

12. The solid state cell of claim 7 wherein the vitreous lithium cation conductor is Li$_2$SiS$_3$.0.25LiI.0.375Li$_2$CO$_3$.

13. The solid state cell of claim 7 wherein the anode is selected from the group consisting of lithium, lithium alloys, sodium, potassium, rubidium, and silver.

14. The solid state cell of claim 7 wherein the cathode is selected from the group consisting of TiS$_2$, MoS$_3$, PVP+I$_2$, PVP+I+TiS$_2$, TiS$_2$+MoS$_3$, FeS$_2$, Sb$_2$S$_3$, and MnO$_2$.

15. The solid state cell of claim 7 wherein the anode is lithium, and the cathode is TiS$_2$.

16. The solid state cell of claim 7 wherein the anode is lithium and the cathode is TiS$_2$+MoS$_3$.

* * * * *